United States Patent [19]

Jacobs

[11] 4,131,313
[45] Dec. 26, 1978

[54] REMOVABLE STORAGE COMPARTMENT FOR AUTO SEATS

[76] Inventor: James E. Jacobs, 903 Tabor Rd., Rte. 13, Box 171, Gadsden, Ala. 35901

[21] Appl. No.: 850,898

[22] Filed: Nov. 14, 1977

[51] Int. Cl.² ............................................. B60R 3/08
[52] U.S. Cl. ........................... 297/188; 224/42.42 A; 297/191
[58] Field of Search ............... 297/188, 219, 191, 217, 297/192, 194; 224/42.42 A, 42.46 B, 42.45 B, 29 D

[56] References Cited

U.S. PATENT DOCUMENTS

| | | | |
|---|---|---|---|
| 2,507,842 | 5/1950 | Waddill | 224/42.42 B |
| 2,767,895 | 10/1956 | Smith | 224/42.42 A |
| 2,771,127 | 11/1956 | Cole | 297/188 X |
| 2,792,055 | 5/1957 | O'Neil | 297/188 |
| 3,014,759 | 12/1961 | Bing | 297/191 |
| 3,151,909 | 10/1964 | Gerdetz | 297/188 |
| 3,295,887 | 1/1967 | Bacon | 297/188 |
| 3,465,930 | 9/1969 | LaCroix | 224/42.42 R |
| 3,479,085 | 11/1969 | Weinstein | 297/191 X |
| 3,580,633 | 5/1971 | DuPriest | 297/188 X |
| 3,632,029 | 1/1972 | Sonner | 224/42.42 A |

Primary Examiner—Roy D. Frazier
Assistant Examiner—Peter A. Aschenbrenner
Attorney, Agent, or Firm—Howard I. Podell

[57] ABSTRACT

A removable storage compartment which includes a plurality of tape pockets in the front thereof intermediate a pair of side utility pockets and elastic straps secured to each end of the utility pockets and removably fastened at their free ends behind the back wall of the vehicle's front seat.

5 Claims, 3 Drawing Figures

REMOVABLE STORAGE COMPARTMENT FOR AUTO SEATS

FIELD OF THE INVENTION

This invention relates generally to a removable storage compartment for auto seats particularly designed to hold tapes.

STATEMENT OF PRIOR ART

The prior art, as exemplified by U.S. Pat. Nos. 3,151,909; 3,014,759; 2,740,466 and 3,309,135 is generally illustrative of various devices of this type. While such devices are generally acceptable for their intended purpose they have not proven to be entirely satisfactory in that they are either complex and expensive to manufacture, or bulky and inconvenient to use, or to operate. As a result of the shortcomings of the prior art, typified by the above, there has developed and continues to exist a substantial need for devices of the character described. Despite this need, and the efforts of many individuals and companies to develop such devices, a satisfactory device meeting this need has heretofore been unavailable.

The principal object of this invention is to provide an article of this character which combines simplicity, strength and durability in a high degree, together with inexpensiveness of construction.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

SUMMARY OF THE INVENTION

This invention resides in a removable storage compartment which includes a plurality of tape pockets in the front thereof intermediate a pair of side utility pockets and elastic straps secured to each end of the utility pockets and removably fastened at their free ends behind the back wall of the vehicle's front seat.

BRIEF DESCRIPTION OF THE DRAWINGS

In the accompanying drawing, in which is shown one of the various possible illustrative embodiments of this invention, wherein like reference character identify the same or like parts.

DESCRIPTION OF THE PREFERRED EMBODIMENT

Figure 1:
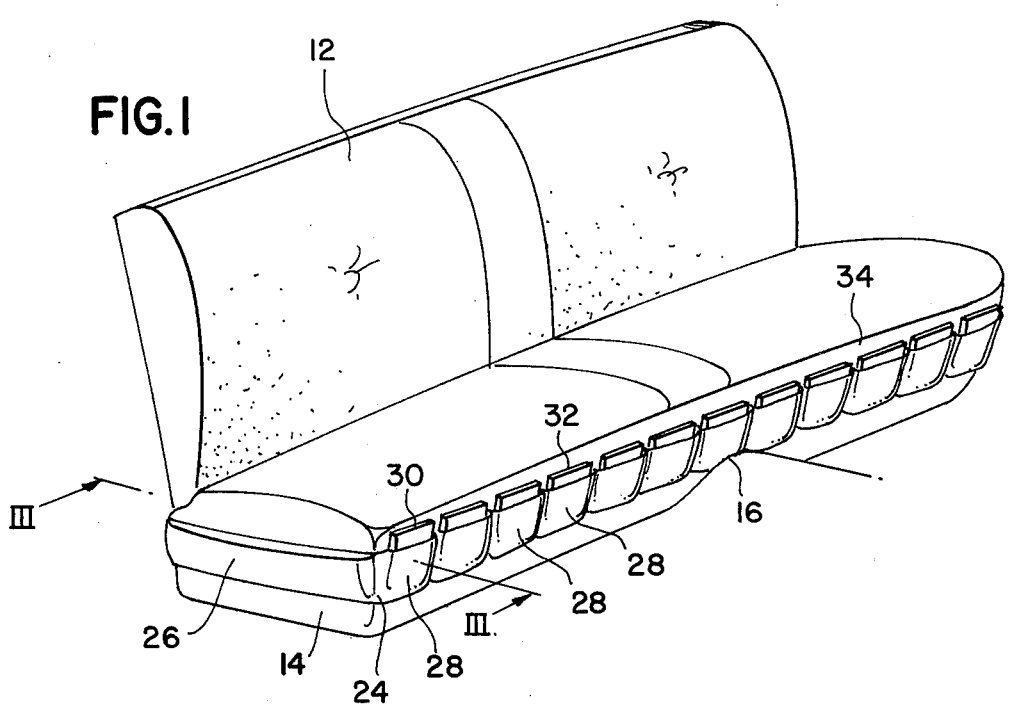
FIG. 1 is a view in perspective of the front seat of a vehicle equipped with the storage compartment of the invention.

With reference to the drawing, there is shown and illustrated a removable storage compartment for tapes and the like constructed in accordance with the principles of the invention and designated generally by reference character 10.

FIG. 1 shows a conventional automobile seat 12 which includes lower horizontal seat portion 14 with a bottom edge 16. The storage compartment 10 consists preferably of two bands 18, 20 made of flexible material such as nylon or canvas of other fabric secured along their bottom edges 22 and at their vertical extremities 24 by stitching, welding or other means appropriate to the constituent material. As shown, the length of the bands 18, 20 is sufficient to extend along substantially the entire width of front seat 12 and its right and left sides opposite the doors. The assembly formed as above described is sub-divided vertically by forming a pair of side utility pockets 26, as well as a plurality of tape pockets 28 of a size suffient to hold the greater part of each tape cassette 30 while leaving the upper part 32 thereof protruding above the top of the compartment to facilitate extraction of the cassette.

Figure 2:
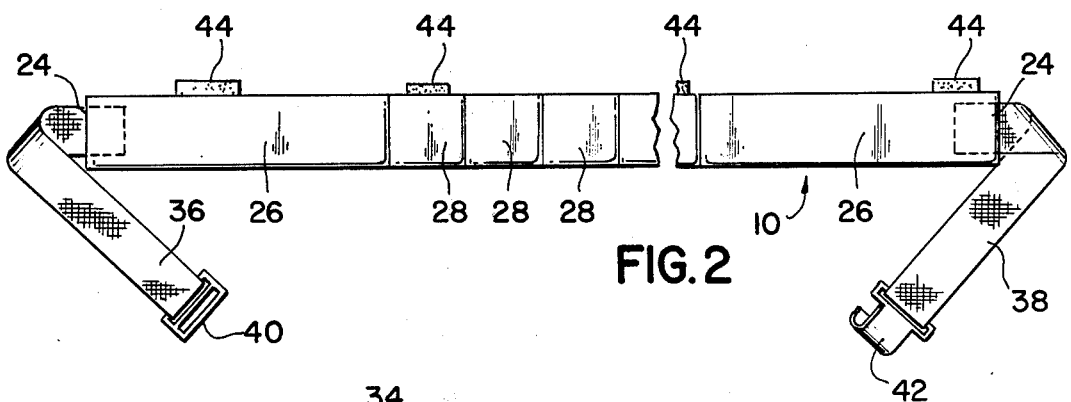
FIG. 2 is a front elevational view thereof.
Figure 3:
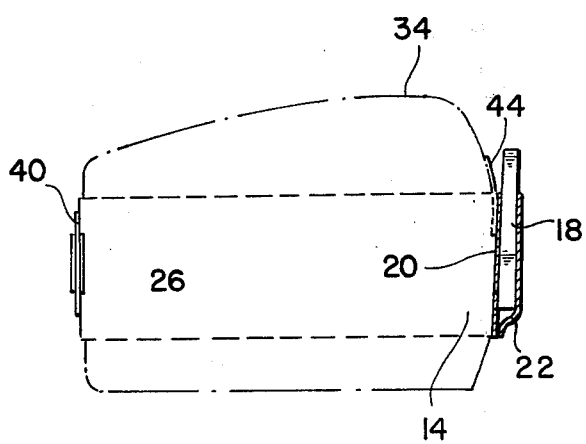
FIG. 3 is a side view, partly in section, of the compartment attached to the said front seat.

As shown in FIGS. 2 and 3, the compartment 10 fits adjustably on the front and side edges of seat 12 about midway between the top 34 of the horizontal part of the seat and the vehicle floor. Fixed to the ends of pockets 26 are elastic straps 36 and 38, the first of which has on its free end a buckle 40 which receives hook 42 at the free end of strap 38.

To further stabilize in place the assembly a plurality of fibrous adhesive bands 44 are fixed to the outside of inner wall 20. If required by the nature of the seat cover material (i.e. if it is smooth) mating bands may be fixed on the seat. Such bands are of the "velcro" type.

The operation and use of the invention hereinabove described will be evident to those skilled in the art to which it relates from a consideration of the foregoing.

It will thus be seen that there is provided a device in which the several objects of this invention are achieved, and which is well adapted to meet the conditions of practical use.

It is thought that persons skilled in the art to which this invention relates will be able to obtain a clear understanding of the invention after considering the foregoing description in connection with the accompanying drawing. Therefore, a more lengthy description is deemed unnecessary.

It is to be understood that various changes in shape, size and arrangement of the elements of this invention as claimed may be resorted to in actual practice, if desired.

Having thus described the invention, what is claimed as new and to be secured by Letters Patent is:

1. A removable storage compartment unit adapted to be detachably secured to a seat assembly of a vehicle about the side periphery of the seat portion of said seat assembly, comprising a band-like member formed of two bands of flexible material joined together along a common bottom edge, which edge is generally parallel to the longitudinal axis of said member, with said bands joined together at spaced distances to form a plurality of first pockets in the member, open to the top edge of the member, which top edge is opposed to said bottom edge, with an individual strap secured to each end of the member, said straps each fitted with means to detachably engage together, in which the unit is of a length to fit entirely about the front, rear and opposed end sides of an automobile seat, when the straps are engaged together.

2. The combination as recited in claim 1 in which at least one strap is formed with elastic means so as to provide adjustment of the length of the unit in the assembled condition about the sides of an attached seat.

3. The combination as recited in claim 1 in which a first set of pockets are located in the intermediate section of the band-like member in a position so as to abut against the front side of a seat to which the unit is attached, with at least one of a second set of pockets located so as to abut against an end side of the attached seat.

4. The combination as recited in claim 3 in which the second set of pockets consist of two pockets each of which are located to abut against opposed end sides of the attached seat.

5. The combination as recited in claim 1 together with fastening means fixed to an external surface of the band-like member such that said means may detachably fasten to an external side of a seat to which the unit is attached to provide stabilization of the unit when so attached to a said seat.

* * * * *